United States Patent
Lo et al.

(10) Patent No.: US 8,243,563 B2
(45) Date of Patent: Aug. 14, 2012

(54) OPTICAL DISC DRIVE CAPABLE OF OPERATION IN LOW-POWER MODE

(75) Inventors: Hong-Jing Lo, Austin, TX (US); Yuan-Chang Lo, Austin, TX (US); Thomas Pratt, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 327 days.

(21) Appl. No.: 11/847,454

(22) Filed: Aug. 30, 2007

(65) Prior Publication Data

US 2009/0064209 A1    Mar. 5, 2009

(51) Int. Cl.
*G11B 21/08* (2006.01)

(52) U.S. Cl. .................... 369/30.32; 720/601

(58) Field of Classification Search .... 369/30.27–30.37; 720/601–717; 700/14, 57, 112, 213, 214; 710/1, 13; 414/1–8
See application file for complete search history.

(56) References Cited

U.S. PATENT DOCUMENTS

| | | | | |
|---|---|---|---|---|
| 5,392,264 A * | 2/1995 | Hira | ............... | 369/30.06 |
| 5,446,904 A * | 8/1995 | Belt et al. | ............... | 713/323 |
| 5,539,590 A * | 7/1996 | Tateishi | ............... | 360/69 |
| 5,548,784 A * | 8/1996 | Easley et al. | ............... | 710/18 |
| 5,649,212 A * | 7/1997 | Kawamura et al. | ............... | 713/324 |
| 5,838,983 A * | 11/1998 | Atkinson | ............... | 713/322 |
| 6,553,532 B1 * | 4/2003 | Aoki | ............... | 714/763 |
| 6,954,804 B2 * | 10/2005 | Lam et al. | ............... | 710/14 |
| 7,278,146 B2 * | 10/2007 | Yoo | ............... | 720/610 |
| 2003/0043702 A1 * | 3/2003 | Lee et al. | ............... | 369/30.24 |
| 2003/0227847 A1 * | 12/2003 | Minabe et al. | ............... | 369/53.27 |
| 2004/0080212 A1 * | 4/2004 | Becker et al. | ............... | 307/10.1 |
| 2006/0119878 A1 * | 6/2006 | Kurosaki | ............... | 358/1.14 |
| 2007/0104042 A1 * | 5/2007 | Sugahara et al. | ............... | 369/30.32 |

FOREIGN PATENT DOCUMENTS

JP    10-093918    * 4/1998

* cited by examiner

*Primary Examiner* — Tan X Dinh
(74) *Attorney, Agent, or Firm* — Larson Newman, LLP (57) ABSTRACT

An information handling system includes an optical disc drive. The optical disc drive is connected to an auxiliary power source so that a drive tray of the optical disc drive can be opened or closed, or a disc inserted or ejected from the optical disc drive when the information handling system is in a low-power mode. In response to these actions in the low-power mode, information is stored to record that the drive tray has been opened or closed. Accordingly, when the information handling system returns to a normal mode, it can take appropriate action, such as dismounting a logical volume associated with a disc that was previously in the drive. Because the optical disc drive can be physically accessed in the low-power mode, the information handling system does not have to enter the normal power mode in order for discs to be retrieved or inserted.

16 Claims, 8 Drawing Sheets

OPTICAL DISC DRIVE CAPABLE OF OPERATION IN LOW-POWER MODE

FIELD OF THE DISCLOSURE

The present disclosure relates to information handling systems and more particularly to optical disc drive devices for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems include optical disc drives, such as CD or DVD drives. For some systems, discs are frequently inserted or removed. However, opening the optical disc drive tray or inserting and ejecting discs from a slot-load optical disc drive can demand an undesirable amount of time, resulting in a poor user experience. Accordingly, there is a need for an improved optical disc drive system.

BRIEF DESCRIPTION OF THE DRAWINGS

The present disclosure may be better understood, and its numerous features and advantages made apparent to those skilled in the art by referencing the accompanying drawings.

DETAILED DESCRIPTION

An information handling system includes an optical disc drive. The optical disc drive is connected to an auxiliary power source so that the drive tray can be opened or closed, or a disc inserted or ejected when the information handling system is in a low-power mode. In response to these actions in the low-power mode, information is stored to record that the drive tray has been opened or closed or a disc inserted or ejected. Accordingly, when the information handling system returns to a normal mode, it can take appropriate action, such as dismounting a logical volume associated with a disc that was previously in the drive. Because the drive can be accessed in the low-power mode, the information handling system does not have to enter the normal power mode in order for discs to be retrieved or inserted. This results in an improved user experience and conserves power consumption at the information handling system.

Figure 1:
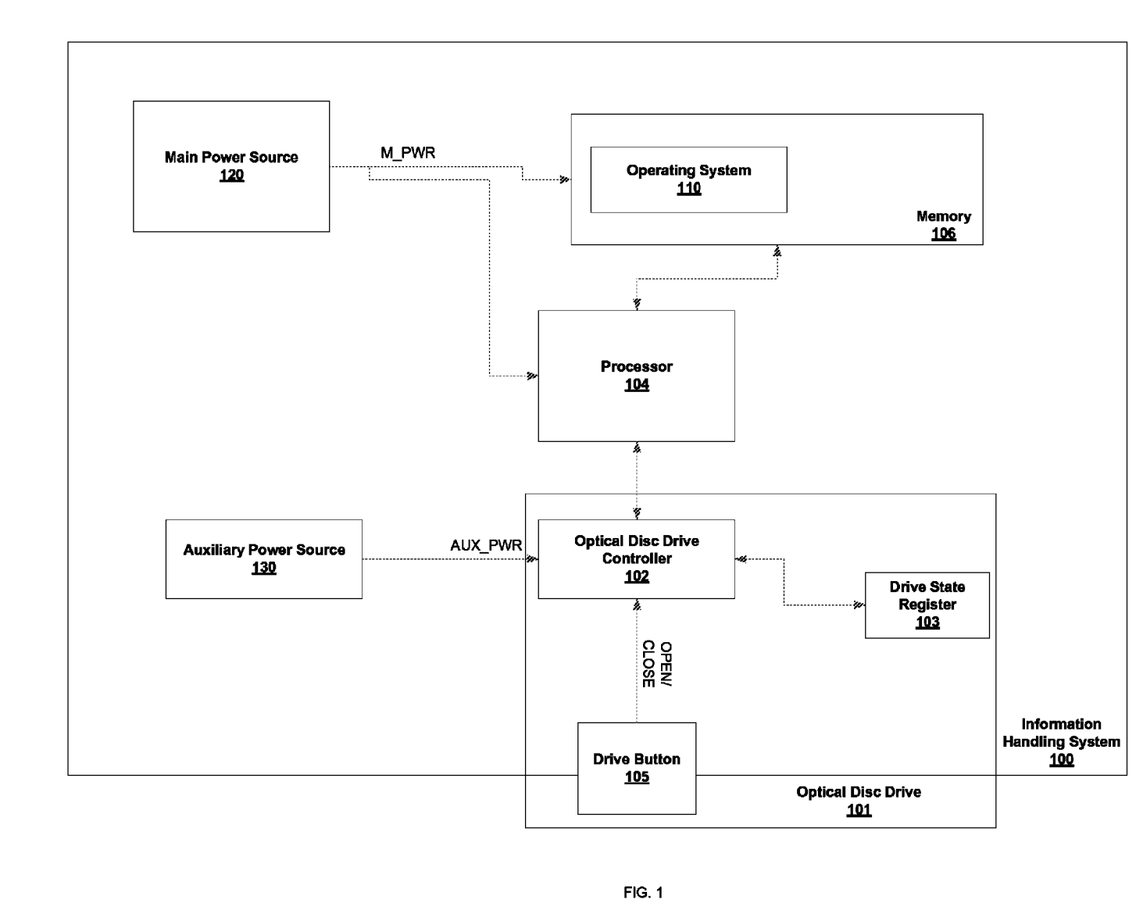
FIG. 1 is a block diagram of a particular embodiment of an information handling system.

FIG. 1 shows an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. An information handling system may include memory, one or more processing resources such as a central processing unit (CPU) or hardware or software control logic. Additional components of an information handling system may include one or more storage devices, one or more communications ports for communicating with external devices as well as various input and output (I/O) devices, such as a keyboard, a mouse, and a video display. An information handling system may also include one or more buses operable to transmit communications between the various hardware components.

The information handling system 100 includes a optical disc drive 101 including an optical disc drive controller 102, a drive state register 103, and a drive button 105. The system 100 further includes a processor 104, a drive button 105, a memory 106, a main power source 120, and an auxiliary power source 130. The drive button 105 includes an output to provide a signal labeled OPEN/CLOSE. The optical disc drive controller 102 includes an input to receive the signal OPEN/CLOSE, an input to receive a voltage labeled AUX_PWR, and a bidirectional connection with the drive state register 103. The processor 104 includes an input to receive a voltage labeled M_PWR, a bi-directional connection with the optical disc drive controller 102, and a bi-directional connection to the memory 106. The memory 106 also includes an input to receive the voltage M_PWR. The main power source 120 includes an output to provide the voltage M_PWR. The auxiliary power source 130 includes an output to provide the voltage AUX_PWR.

The information handling system 100 is configured to operate in a number of different power modes, including a normal (or active) mode and one or more low-power modes. As used herein, the term "normal mode" refers to a mode where the information handling system 100 can perform normal functions, such as executing software, at normal specified speeds. The term "low-power mode" refers to a mode where the information handling system 100 cannot perform normal functions at normal speeds. A low-power mode can be a sleep mode, a shutdown mode, or other low power mode. Further, in some low-power modes one or more modules of the information handling system can remain operable. For example, in some low-power modes the processor 104 does not execute instructions but the memory 106 is able to retain stored data.

The optical disc drive 101 can be a Compact Disc (CD) drive, a Digital Versatile Disc (DVD) drive, and the like. Further, the optical disc drive 101 can be a read only drive, a read-write drive, and the like. In addition, the optical disc drive 101 can be a half-height tray load drive, a slim line tray load drive, a slot-loaded drive, and the like. The drive button 105 is configured to provide an indication via the OPEN/CLOSE signal to the optical disc drive controller 102 that the drive button has been pressed. The optical disc drive controller 102 is configured to take action in response to the OPEN/CLOSE signal, such as opening a drive tray, closing the drive tray, ejecting a disc (in the case of a slot-loaded drive), and the like.

The drive state register 103 is configured to store drive state information for the optical disc drive 102. Drive state information can include information indicating whether the optical disc drive 102 has been opened or closed, whether a disc is present in the optical disc drive 102, and the like. In a particular embodiment, the drive state register is non-volatile memory, such as flash memory. In another particular embodiment the drive state register 103 is RAM memory.

The processor 104 is configured to execute instructions to perform tasks when the information handling system 100 is in a normal operating mode. In response to the appropriate instructions, the processor 104 is configured to read or write information to the optical disc drive 101. The processor 104 is also configured to request the drive state information stored at the drive state register 103 from the optical disc drive controller 102 to determine information about the optical disc drive 101.

The memory 106 is configured to store instructions for execution by the processor 104, such as an operating system 110. The memory 106 can also store additional data. The memory 106 can be volatile memory, such as random access memory (RAM), or non-volatile memory, such as flash memory or a hard disc. In one embodiment, the memory 106 is RAM that is configured to retain stored information in one low-power mode of the information handling system 100. In another low-power mode, the memory 106 is configured to write the stored information to a hard disc or other non-volatile memory (not shown).

The main power source 120 is configured to provide the voltage M_PWR. The main power source 120 is further configured to set the level of the voltage M_PWR depending on the power mode of the information handling system 100. For example, when the information handling system is in the normal power mode, the main power source 120 is configured to set the level of the voltage M_PWR so that the processor 104 is capable of executing instructions at normal speed and the memory 106 can retained stored data. In one low-power mode (e.g. a sleep mode), the main power source 120 is configured to set the level of the voltage M_PWR so that processor 104 cannot execute instructions at a normal speed, but the memory 106 is able to retain stored information. In another low-power mode (e.g. a hibernate mode), the main power source 120 is configured to set the level of the voltage M_PWR so that processor 104 cannot execute instructions at a normal speed and the memory 106 is not able to retain stored information. In a third low power mode (e.g. a shutdown mode) the main power source 120 may set the voltage M_PWR to a ground reference voltage or allow the voltage M_PWR to float.

The auxiliary power source 130 is configured to provide the voltage AUX_PWR. The auxiliary power source 130 is further configured to set the level of the voltage AUX_PWR so that a tray of the optical disc drive 101 is able to be opened or closed, or a disc inserted or ejected by a user, when the information handling system 100 is in one or more of the low-power modes, including the sleep mode, the hibernate mode, and the shutdown mode. As used herein, the term "physically accessed" is used to refer to the opening or closing of an optical disc drive tray in the case of a tray drive, and to refer to ejection or insertion of a disc in the case of a slot-load drive.

During operation, a tray of the optical disc drive 101 can be physically accessed in both the normal power mode and the low-power modes of the information handling system 100. In the normal mode, when the drive button 105 is pressed, information indicating the button press is provided via the OPEN/CLOSE signal. In response, the optical disc drive controller 102 takes the appropriate action, including opening the drive tray (in the case of a tray drive that is closed), closing the drive tray (in the case of a tray drive that is open), ejecting the disc (in the case of a slot drive that includes a disc), and the like. The optical disc drive controller 102 can record information indicating the action in the drive state register 103, as well as information indicating whether a disc is located in the drive. The operating system 110, being executed by the processor 104, accesses the drive state information in the drive state register 103 via the optical disc drive controller 102 and can take action based on the information, such as indicating that a disc has been placed in the optical disc drive 101, that a drive tray is open, and the like.

In the low-power mode of the information handling system 100, if the drive button 105 is pressed, the optical disc drive controller 102 takes the appropriate action. Because the optical disc drive 101 is powered by the AUX_PWR voltage, it is able to open the drive tray, close the drive tray, eject discs, and the like even when the information handling system is in a low-power mode, including a shutdown mode. Thus, a user can open or close a tray of the optical disc drive 101, or eject or insert a disc at the optical disc drive 101, without returning the information handling system 100 to a normal power mode, thereby conserving power. Further, this can result in an improved user experience, as the user does not have to wait for the information handling system to return to the normal mode in order to retrieve or insert a disc.

In response to the drive button 105 being pressed or a disc being inserted at the optical disc drive 101 in the low-power modes, information is stored in the drive state register 103 indicating the drive has been opened or closed or that a disc has been inserted or ejected. When the information handling system 100 returns to the normal power mode, the operating system 110 can determine, based on the drive state information, that a tray of the optical disc drive 101 was opened or closed or a disc inserted or ejected in the low-power modes. In response, the operating system 110 can take appropriate action. For example, the operating system 110 can determine that a disc that was previously located in the optical disc drive 101 has been removed and therefore dismount the logical volume associated with the disc. The operating system 110 can also determine that a new disc has been inserted in the optical disc drive 101 and display information to a user regarding the new disc. The operating system 110 can also display an error message if a disc was removed that was being accessed prior to the information handling system entering the low-power modes.

In a particular embodiment, in response to a tray of the optical disc drive 101 being opened or closed or a disc inserted or ejected, the optical disc drive controller 102 can communicate the appropriate information to the processor 104 asynchronously. In response, the processor 104 can take appropriate action to respond to the action at the optical disc drive 101. This allows notification of the state of the optical disc drive 101 to be provided to the processor 104 asynchronously, reducing processor overhead. In the case of the optical disc drive 101 being opened or closed, or a disc inserted or ejected, during a low-power mode, the optical disc drive controller 102 can provide the information asynchronously when the information handling system 100 returns to the normal power mode. Accordingly, in this embodiment the processor 104 does not have to poll the optical disc drive controller 102 to provide drive state information in the drive state register 103 each time the information handling system 100 returns to the normal power mode. In another embodiment, the processor 104 can poll the optical disc drive controller 102 to provide information at the drive state register 103 to determine whether a tray of the optical disc drive 101 has been opened or closed or a disc inserted or ejected.

In a particular embodiment, the operating system 110 or other software can lock the optical disc drive 101. When the optical disc drive 101 is locked, a drive tray cannot be opened or closed or a disc ejected by pressing the drive button 105 or a disc inserted (in the case of a slot-load drive), even when the information handling system 100 is in a low-power mode. Accordingly, the operating system 110 can prevent the optical disc drive 102 from being opened or closed, or a disc inserted or ejected for particular situations, such as if a disc in the optical disc drive 101 is being accessed by software, or if the disc needs to be accessed by software upon return to the normal power mode.

Figure 2:
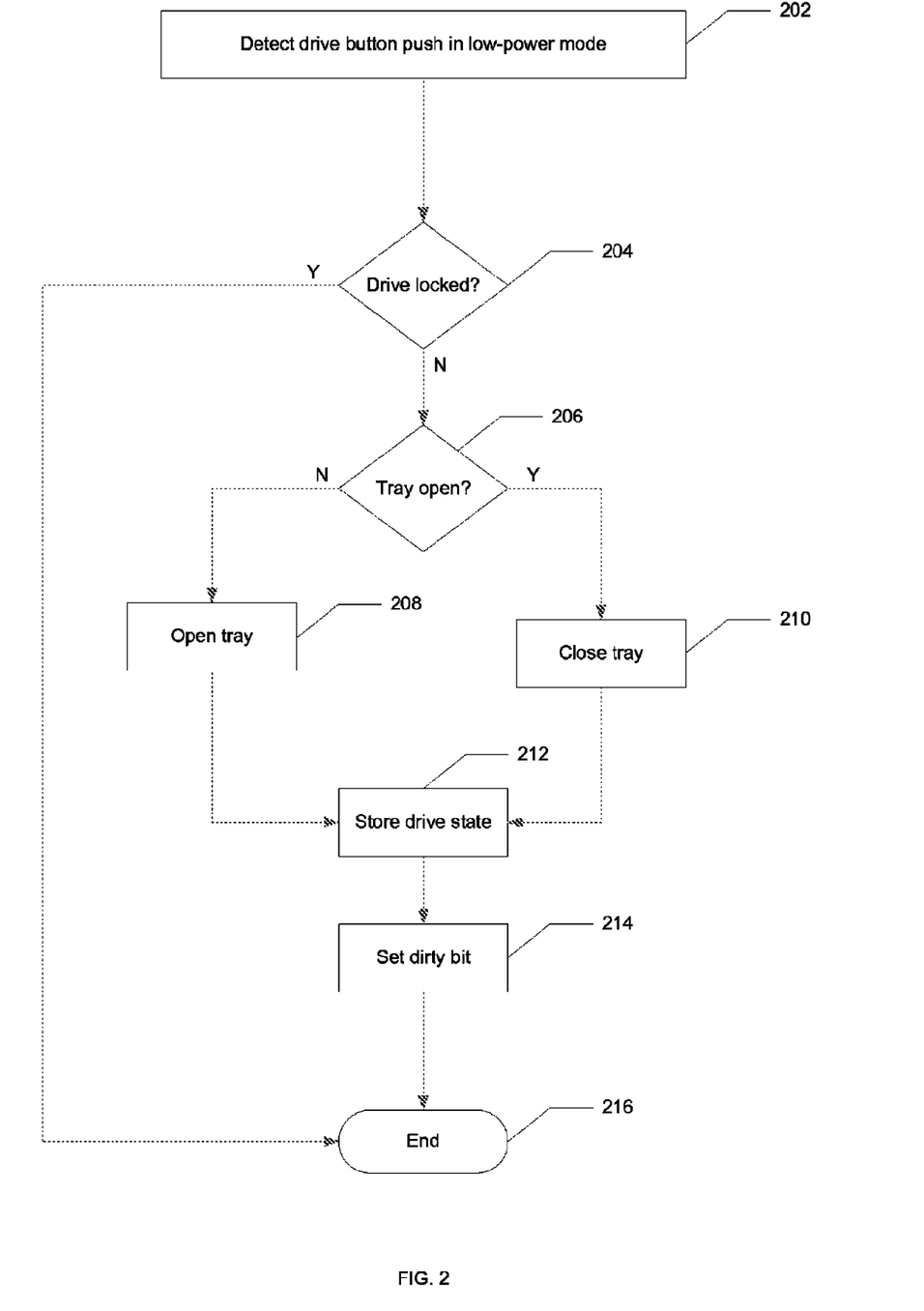
FIG. 2 is a flow diagram of a particular embodiment of a method of opening and closing an optical disc drive tray.

Referring to FIG. 2, a flow diagram of a particular embodiment of a method of opening or closing a half-height tray load optical disc drive is illustrated. At block 202 a drive button push at a disc drive is detected when the information handling system is in a low-power mode. In response, the disc drive determines if the drive tray has been locked at block 204. If the drive tray is locked the method flow moves to block 216 and ends.

If, at block 204, the optical disc drive system determines that the tray is not locked, the method flow moves to block 206, and the disc drive determines whether the optical disc drive tray is open. If so, the method flow moves to block 210 and the disc drive closes the tray. If not, the method flow moves to block 208 and the tray is opened. At block 212, the tray state (e.g. open or closed) is stored. The method flow moves to block 214 and a dirty bit is set to indicate that the optical disc drive was opened in the low-power mode. The method flow proceeds to block 216 and the method ends.

Figure 3:
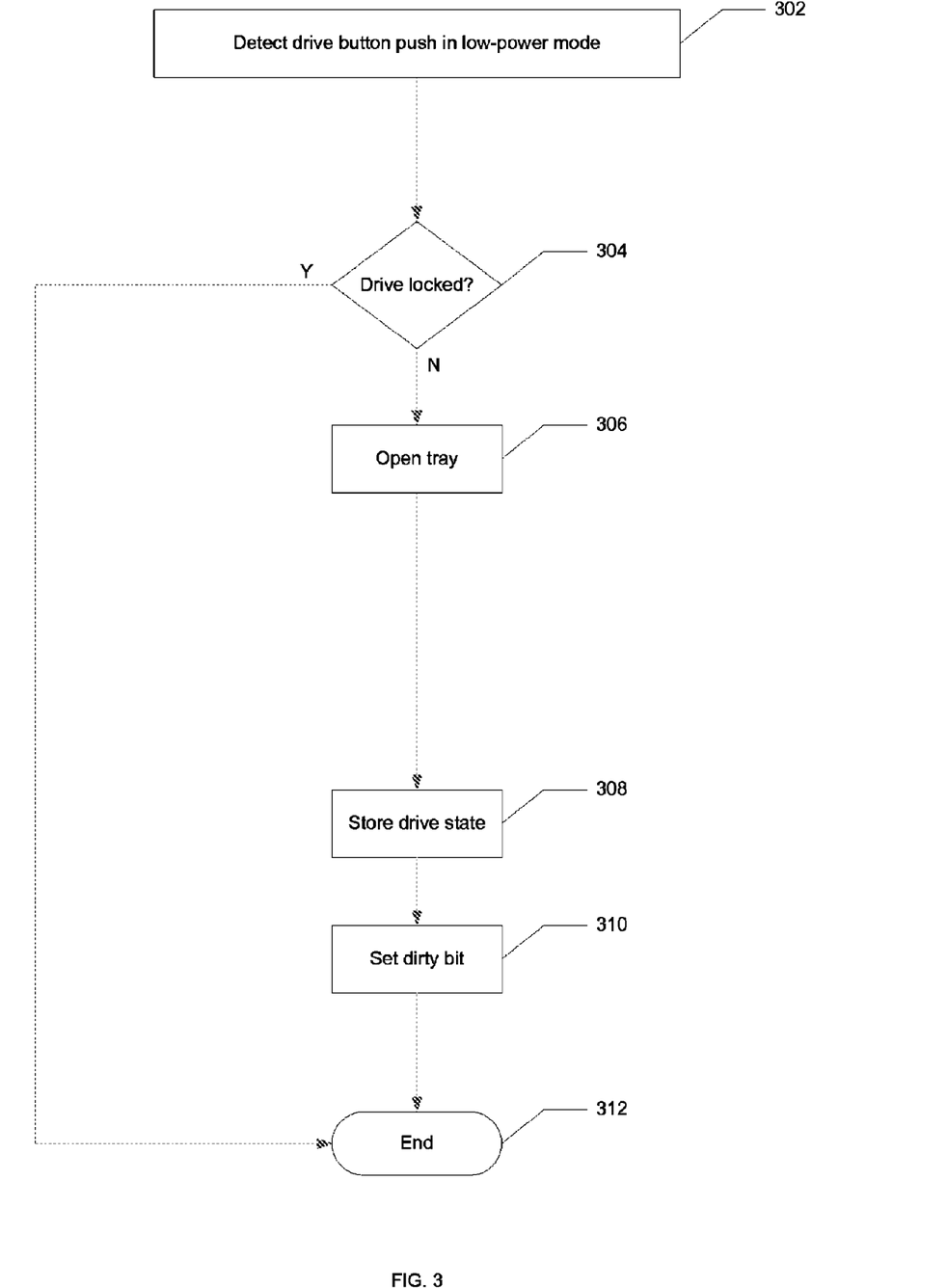
FIG. 3 is a flow diagram of an alternative embodiment of a method of opening an optical disc drive tray.

Referring to FIG. 3, a flow diagram of a particular embodiment of a method of opening a slim-line tray load optical disc drive is illustrated. At block 302, the disc drive detects a drive button push for the optical disc drive when the system is in a low-power mode. In response to the button push, the optical disc drive determines whether the drive tray has been locked at block 304. If so, the method flow moves to block 312 and ends.

If the optical disc drive is determined to be unlocked at block 304, the method flow proceeds to block 306 and the optical disc drive opens the optical disc drive tray. At block 308 drive information is stored to indicate that the optical disc drive is open. The method flow proceeds to block 310 and the optical disc drive sets a dirty bit to indicate that the drive has been opened. The method flow moves to block 312 and the method ends.

Figure 4:
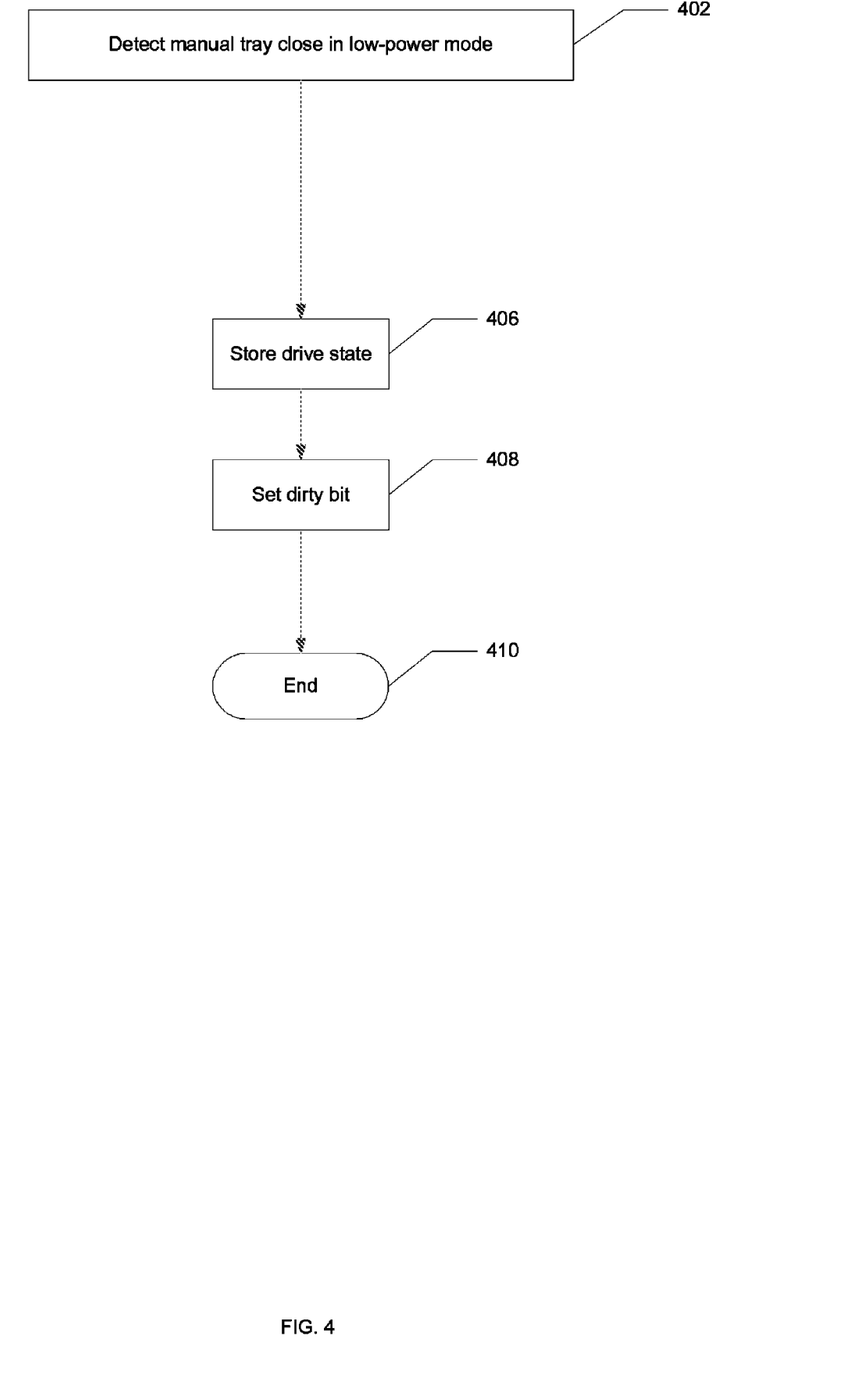
FIG. 4 is a flow diagram of a particular embodiment of a method of closing an optical disc drive tray.

Referring to FIG. 4, a flow diagram of a particular embodiment of a method of closing a slim-line tray load optical disc drive is illustrated. At block 402, the optical disc drive detects a manual drive close for the optical disc drive when the system is in a low-power mode. In response to the drive tray closing, the disc drive stores drive state information at block 406, to indicate that the drive tray is closed. The method flow moves to block 408 and a dirty bit is set in the drive state information to indicate that the optical disc drive tray has been closed.

Figure 5:
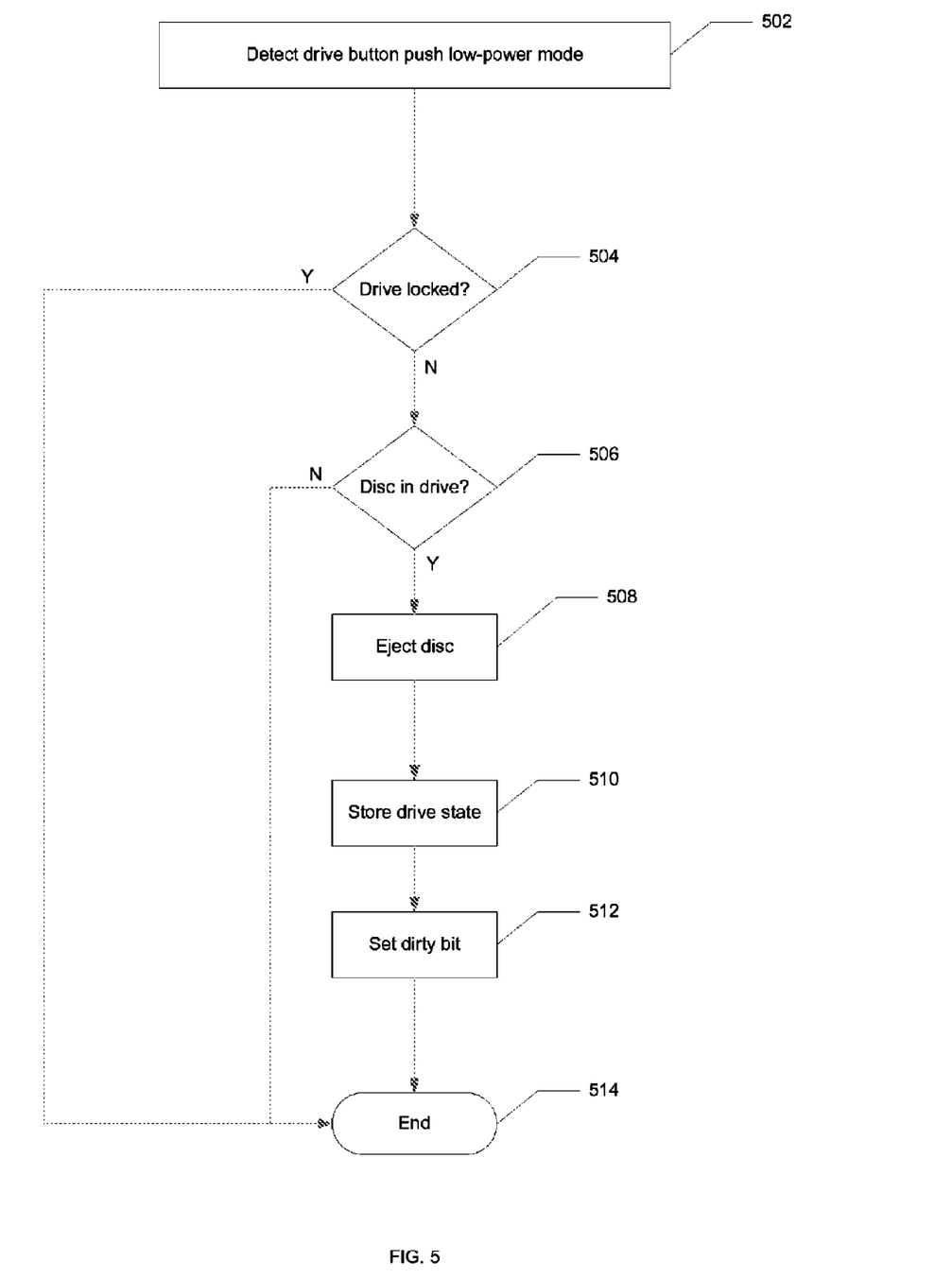
FIG. 5 is a flow diagram of a particular embodiment of a method of ejecting a disc from an optical disc drive.

Referring to FIG. 5, a flow diagram of a particular embodiment of a method of ejecting a disc from a slot-load optical disc drive is illustrated. At block 502, the disc drive detects a drive button push when the system is in a low-power mode. In response, at block 504 the optical disc drive determines whether it has been locked. If so, the method flow moves to block 514 and the method ends.

If, at block 504, the optical disc drive determines that the drive is not locked, the method flow moves to block 506 and the optical disc drive determines whether there is a disc in the optical disc drive. If not, the method flow moves to block 514 and the method ends. If there is a disc in the optical disc drive, the method flow proceeds to block 508 and the optical disc drive ejects the disc. The method flow moves to block 510 and the drive state information is stored to indicate that the disc has been ejected. At block 512, the optical disc drive sets a dirty bit to indicate that the disc was ejected in the low-power mode. The method flow proceeds to block 514 and the method ends.

Figure 6:
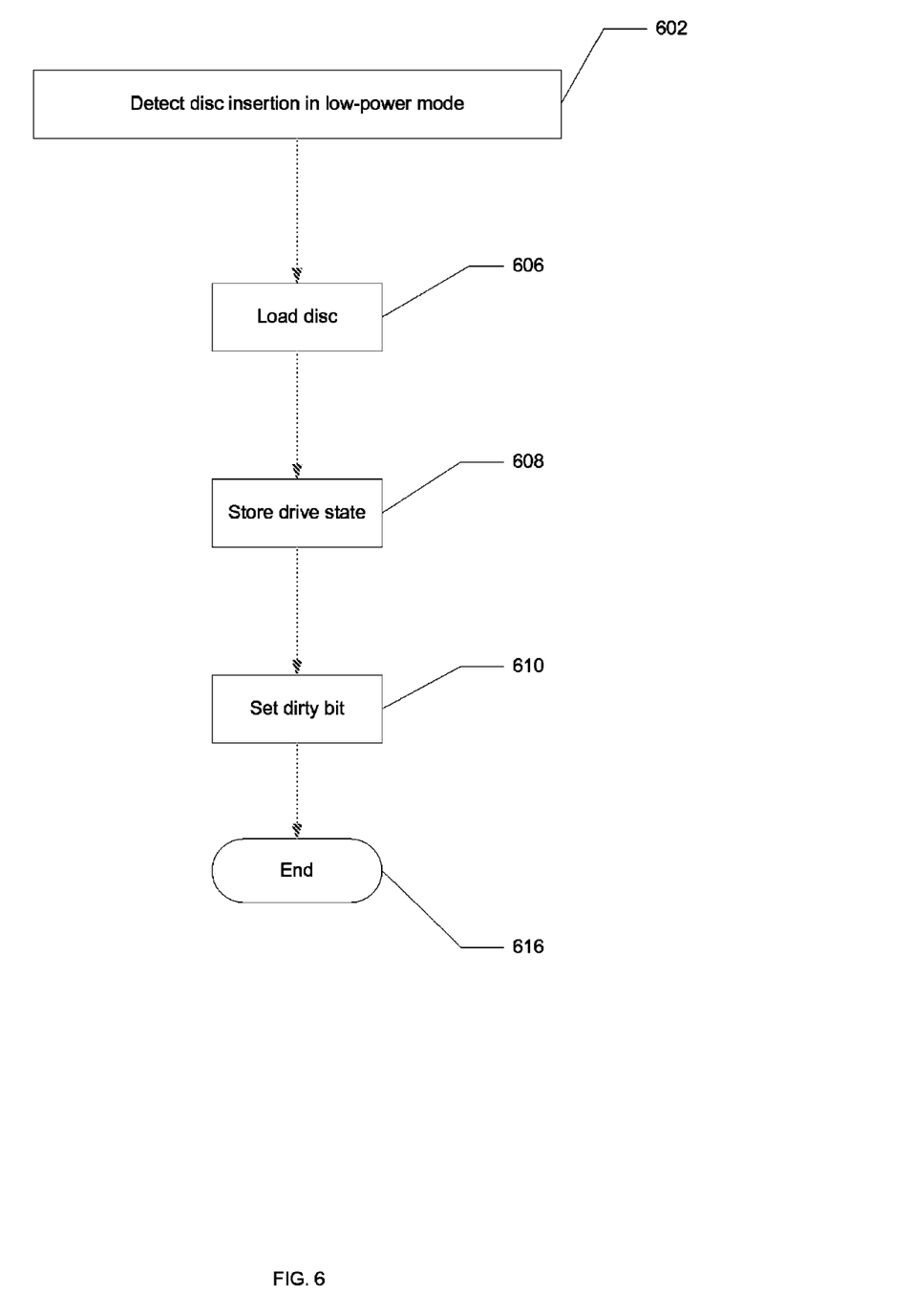
FIG. 6 is a flow diagram of another particular embodiment of a method of loading a disc in an optical disc drive.

Referring to FIG. 6, a flow diagram of a particular embodiment of a method of inserting a disc into a slot-load optical disc drive is illustrated. At block 602, the optical disc drive detects that a disc has been inserted into the drive when the information handling system is in a low-power mode.

The method flow proceeds to block 606 and the optical disc drive loads the inserted disc. The method flow moves to block 608 and the optical disc drive stores drive state information to indicate that the disc has been inserted. The method flow moves to block 610 and the optical disc drive sets a dirty bit to indicate that the disc was inserted when the system was in low power mode. The method flow proceeds to block 616 and the method ends.

Figure 7:
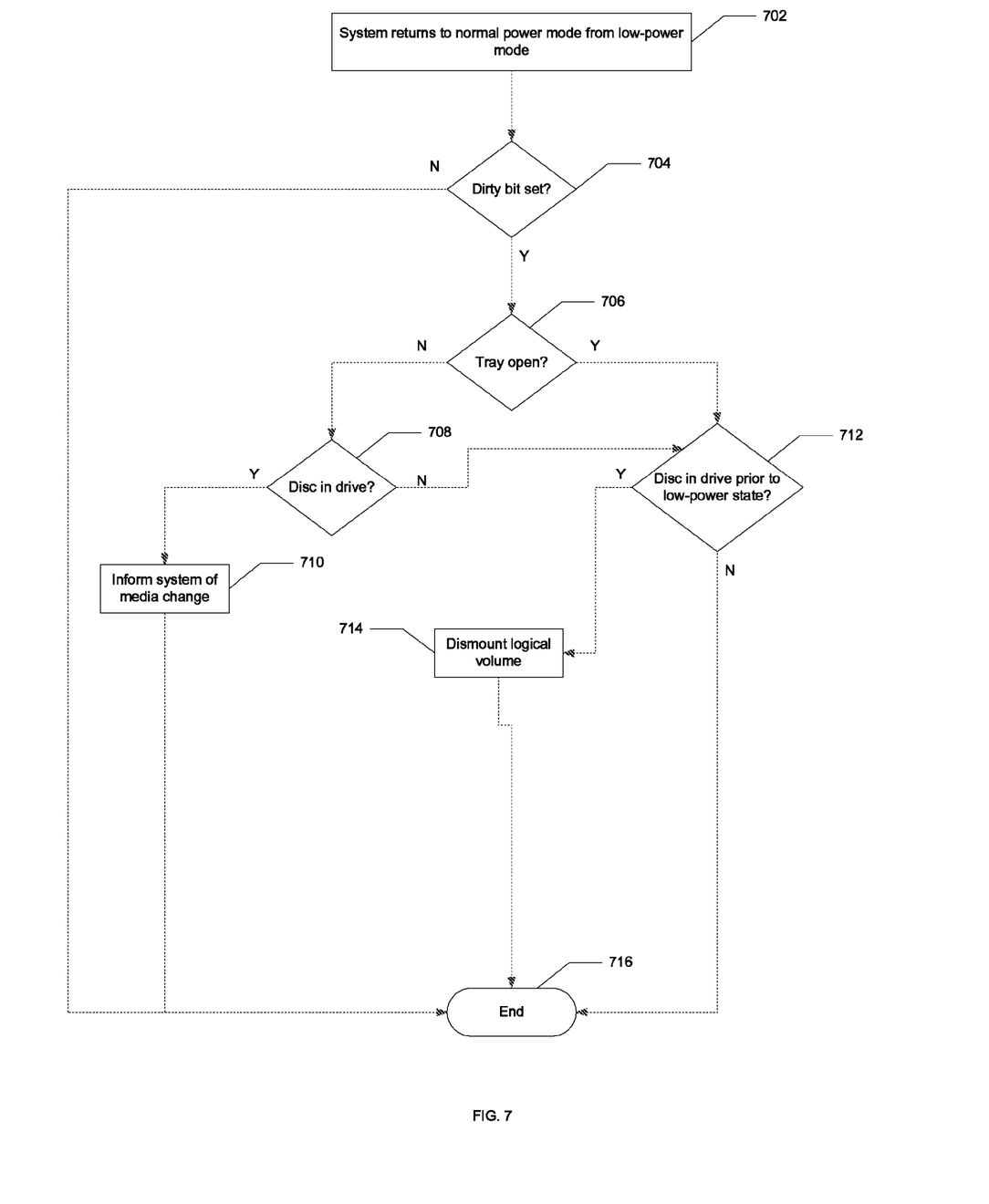
FIG. 7 is a flow diagram of a particular embodiment of a method of determining that an optical disc drive has been opened.

Referring to FIG. 7, a flow diagram of particular embodiment of a method of determining that a tray-load optical disc drive has been opened or closed is illustrated. At block 702, an information handling system returns to a normal power mode from a low-power mode. This can occur as the result of a user input, expiration of a specified period of time, and the like. In response to returning to the normal power mode, the information handling system determines at block 704 if a dirty bit for the optical disc drive has been set. The information handling system can determine that the dirty bit was set by receiving an asynchronous communication from the disc drive or by polling the disc drive. The dirty bit indicates whether the optical disc drive was opened or closed when the information handling system was in the low-power mode. If the dirty bit is not set, the method flow moves to block 716 and the method ends.

If the dirty bit is set, the method flow moves to block 706 and the information handling system determines whether the optical disc drive tray is open. If so, the method flow moves to block 712 and the information handling system determines whether a disc was in the optical disc drive prior to the system entering the low-power state. If not, the method flow proceeds to block 716 and the method ends. If there was a disc in the drive prior to entering the low-power mode, the method flow moves to block 714 and the information handling system dismounts a logical volume associated with the disc that was in the drive. The method flow moves to block 716 and the method ends. Accordingly, the information handling system is configured to determine if the disc in the optical disc drive was removed during the time that the system was in the low-power state, and dismount the logical volume associated with the disc accordingly.

If, at block 706, the information handling system determines that the optical disc drive tray is not open, the method flow proceeds to block 708 and the information handling system determines if there is a disc present in the optical disc drive. If not, the method flow moves to block 712 so that the information handling system can determine whether a disc was removed. If there is a disc in the drive, the method flow proceeds to block 710, and the information handling system is informed that the media in the optical disc drive was changed when the system was in the low-power mode. The information handling system takes appropriate action, such as displaying a message indicating the media change. The method flow proceeds to block 716 and the method ends.

Figure 8:
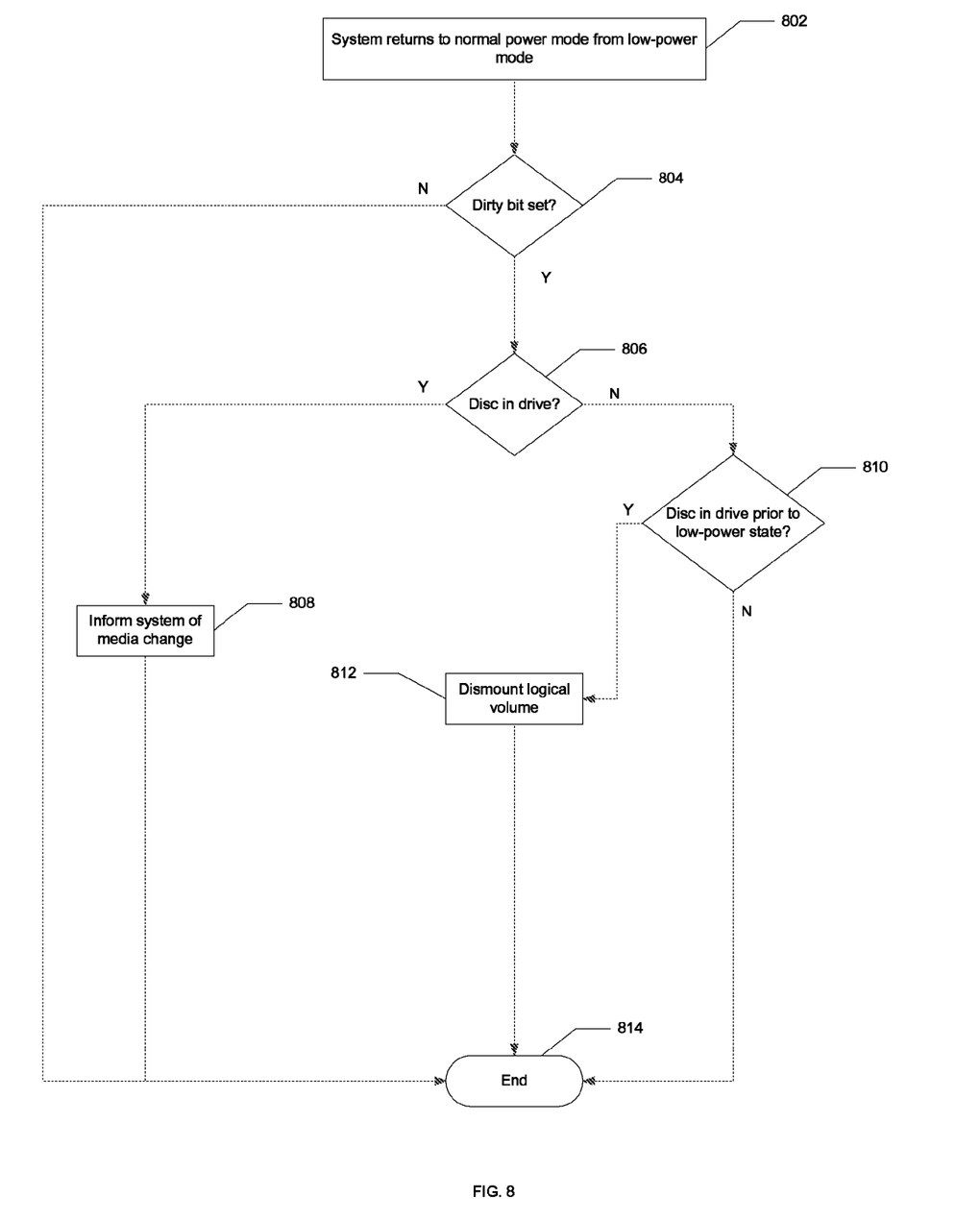
FIG. 8 is a flow diagram of an alternative embodiment of a method of determining that an optical disc drive has been opened.

Referring to FIG. 8, a flow diagram of particular embodiment of a method of determining that a disc has been inserted into or ejected from a slot-load optical disc drive is illustrated. At block 802, an information handling system returns to a normal power mode from a low-power mode. In response to returning to the normal power mode, the information handling system determines at block 804 if a dirty bit in the optical disc drive has been set. The dirty bit indicates whether a disc was inserted or ejected from the optical disc drive when the information handling system was in the low-power mode. If the dirty bit is not set, the method flow moves to block 814 and the method ends.

If the dirty bit is set, the method flow moves to block 806 and the information handling system determines whether there is a disc present in the optical disc drive. If not, the method flow moves to block 810 and the information handling system determines whether a disc was in the drive prior to the information handling system entering the low-power state. If not, the method flow moves to block 814 and the method ends. If the information handling system determines there was a disc in the drive when the system entered the low-power mode, this indicates that a disc has been removed. Accordingly, the method flow moves to block 812 and the information handling system dismounts a logical volume associated with the disc. The method flow proceeds to block 814 and the method ends.

If, at block 806 it is determined that there is a disc in the drive, the method flow moves to block 808 and the information handling system is informed that the media in the disc drive has changed. The method flow proceeds to block 814 and the method ends.

What is claimed is:

1. A method, comprising:
   receiving assertion of a signal indicative of an input at an optical disc drive of a computer device, the indication received during a first period when the computer device is in a low-power mode;
   determining, during the first period, if a tray of the optical disc drive is open in response to assertion of the signal;
   opening the tray of the optical disc drive during the first period in response to determining that the tray of the optical disc drive is closed;
   storing at a storage location, during the first period, information indicating that the tray of the optical disc drive has been opened during the first period in response to opening the tray of the optical disc drive, wherein the information is stored by setting a dirty bit in the storage location;
   during a second period, detecting that the dirty bit was set during the first period;
   during the second period, determining at the computer device that the optical disc drive was opened during the first period based on information stored at the storage location and the dirty bit, the second period corresponding to a period when the computer device is in a normal mode;
   after detecting that the dirty bit was set, determining that a disc that was previously located in the optical disc drive was removed during the first period;
   dismounting a logical volume associated with the disc during the second period in response to detecting that the dirty bit was set and in response to determining that the disc was removed during the first period;
   after determining that the disc was removed, determining that a new disc other than the disc that was previously located in the optical disc drive has been inserted into the optical disc drive; and
   displaying information associated with the new disc in response to determining that the new disc has been inserted into the optical disc drive.

2. The method of claim 1, further comprising:
   closing the tray of the optical disc drive during the first period in response to determining that the tray of the optical disc drive is open; and
   storing, during the first period, information indicating that the tray of the optical disc drive has been closed during the first period in response to closing the tray of the optical disc drive.

3. The method of claim 1, further comprising:
   determining, during the first period, if the optical disc drive is in a locked state; and
   wherein determining if the tray of the optical disc drive is open comprises determining if the tray of the optical disc drive is open in response to determining that the optical disc drive is not in a locked state.

4. The method of claim 1, further comprising:
   determining if the tray of the optical disc drive is open in response to determining the optical disc drive was opened or closed during the first period;
   wherein dismounting the logical volume comprises dismounting the logical volume in response to determining the optical disc drive is open.

5. The method of claim 4, further comprising:
   determining if the disc was present in the optical disc drive prior to the first period;
   wherein dismounting the logical volume comprises dismounting the logical volume in response to determining that the disc was present in the optical disc drive prior to the first period.

6. The method of claim 4, further comprising:
   determining if the disc is present in the optical disc drive in response to determining that the tray of the optical disc drive is closed; and
   wherein dismounting the optical disc logical volume comprises dismounting the optical disc logical volume in response to determining that the disc is not present in the optical disc drive.

7. The method of claim 1, wherein determining during the second period that the tray of the optical disc drive was opened or closed during the first period comprises receiving an asynchronous communication indicating the optical disc drive was opened or closed.

8. The method of claim 1, further comprising:
   providing a notification during the second period to a processor at the computer device that the drive was opened or closed during the first period based on the information stored at the storage location.

9. The method of claim 1, wherein the low-power state corresponds to a shutdown state of the computer device.

10. The method of claim 1, wherein the low-power state corresponds to a sleep state of the computer device.

11. A method, comprising:
- receiving an indication that an optical disc drive of a computer device has been physically accessed, the indication received during a first period when the computer device is in a low-power mode;
- in response to determining that the indication indicates a drive button has been pressed determining, during the first period, if a disc is present in the optical disc drive;
- ejecting the disc from the optical disc drive during the first period in response to determining that the disc is present in the optical disc drive;
- storing at a storage location, during the first period, information indicating that the disc was ejected from the optical disc drive during the first period in response to ejecting the disc, wherein the information includes setting a dirty bit of the storage location;
- based on the dirty bit at the storage location, determining during a second period that the disc was ejected during the first period, the second period corresponding to a period when the computer device is in a normal state;
- dismounting a logical volume associated with the disc during the second period in response to the dirty bit and in response to determining during the second period that the disc was ejected during the first period;
- after dismounting the logical volume, determining that a new disc has been inserted into the optical disc drive; and
- displaying information associated with the new disc in response to determining that the new disc has been inserted into the optical disc drive.

12. The method of claim 11, further comprising:
- in response to determining that the indication indicates a new disc has been inserted in the optical disc drive storing, during the first period, at the storage location information indicating that the new disc was inserted in the optical disc drive during the first period.

13. An information handling system, comprising:
- a first power source comprising an output to provide a first voltage when the information handling system is in a normal power mode and a second voltage when the information handling system is in a low-power mode;
- a second power source comprising an output to provide a second voltage;
- an optical disc drive coupled to the second power source;
- a storage location coupled to the optical disc drive, the storage location configured to store information to indicate that the optical disc drive was physically accessed when the information handling system was in the low-power mode, wherein the information includes setting a dirty bit of the storage location; and
- a processor coupled to the storage location, the processor configured to access the storage location to determine, when the information handling system is in the normal power mode, if the optical disk drive was physically accessed when the information handling system was in the low-power mode, configured to dismount a logical volume associated with a disc during the normal power mode in response to determining during the normal power mode that the dirty bit was set during the low-power mode and in response to determining that the disc was removed during the low-power mode, configured to determine that a new disc has been inserted into the optical disc drive after dismounting the logical volume, and configured to display information associated with the new disc in response to determining that the new disc has been inserted into the optical disc drive.

14. The information handling system of claim 13, wherein the optical disc drive is configured to provide an asynchronous communication to the processor in response to the tray of the optical disc drive being physically accessed when the information handling is in the low-power mode, the asynchronous communication being provided when the information handling system is in the normal power mode.

15. The information handling system of claim 13, wherein the low-power mode corresponds to a sleep mode.

16. The information handling system of claim 14, wherein the low-power mode corresponds to a shutdown mode.

* * * * *